United States Patent [19]
Blumenaus

[11] Patent Number: 5,356,102
[45] Date of Patent: Oct. 18, 1994

[54] PUSH RELEASE SPRING CLIP

[76] Inventor: Jon M. Blumenaus, 1904 Brookhaven Cir., Dalton, Ga. 30720

[21] Appl. No.: 980,211

[22] Filed: Nov. 23, 1992

[51] Int. Cl.⁵ .............................................. F16B 47/00
[52] U.S. Cl. ................ 248/205.5; 248/206.5; 248/231.8
[58] Field of Search ............... 248/205.1, 205.5, 205.6, 248/205.7, 206.1, 206.2, 206.5, 231.8, 362, 363, 316.7; 24/295, 337

[56] References Cited

U.S. PATENT DOCUMENTS

| | | |
|---|---|---|
| 840,618 | 1/1907 | Golombek . |
| 957,804 | 5/1910 | Schroeder . |
| 979,436 | 12/1910 | Corbin . |
| 993,989 | 5/1911 | Hazelrigg . |
| 1,158,005 | 10/1915 | Richards, Jr. . |
| 1,263,030 | 4/1918 | Brown et al. . |
| 1,715,602 | 6/1929 | Jones . |
| 1,729,872 | 10/1929 | Hauge . |
| 1,922,900 | 8/1933 | Plante . |
| 2,045,672 | 6/1936 | Oliveri ............................. 248/205.5 |
| 2,505,899 | 5/1950 | Jobe . |
| 2,800,078 | 7/1957 | Lightbourn . |
| 2,961,210 | 11/1960 | Pfaff et al. .................... 248/205.1 X |
| 3,350,045 | 10/1967 | Mayers .......................... 248/206.5 X |
| 4,197,616 | 4/1980 | Panuski ......................... 248/205.7 X |

FOREIGN PATENT DOCUMENTS

| | | | |
|---|---|---|---|
| 0552961 | 5/1923 | France ............................. 248/206.1 |
| 6608281 | 9/1960 | Italy ................................. 248/205.7 |
| 0304491 | 1/1929 | United Kingdom ............ 248/206.1 |

*Primary Examiner*—Ramon O. Ramirez
*Attorney, Agent, or Firm*—Kerkam, Stowell, Kondracki & Clarke

[57] ABSTRACT

A spring clip for attaching articles to a support surface includes an elongated spring member having opposed end portions adapted to resiliently engage the support surface and to have its central body releasably attached to the support surface. An actuating lever has one end attached to the spring adjacent one end of the spring with the lever extending in spaced relation to the spring to a free end near the other end of the spring. Resilient spacer means between the spring and lever acts as a fulcrum whereby force applied to the free end of the lever in the direction of the support surface will raise the end of the spring from the surface to enable articles to be inserted thereunder.

21 Claims, 2 Drawing Sheets

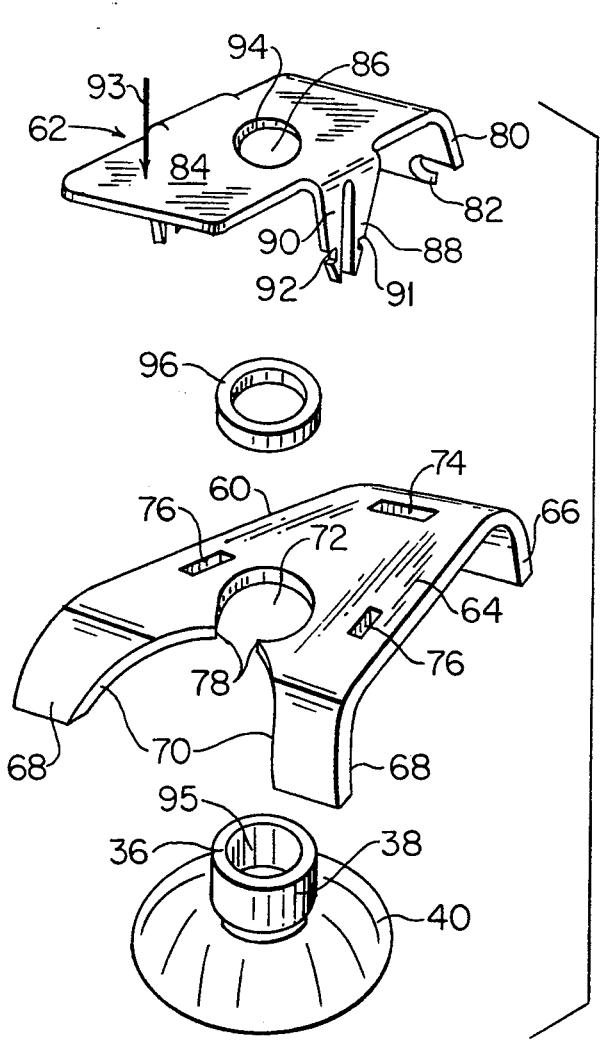
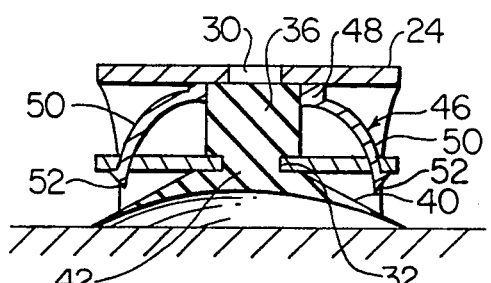
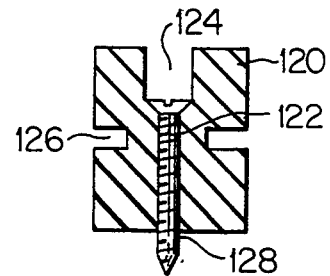
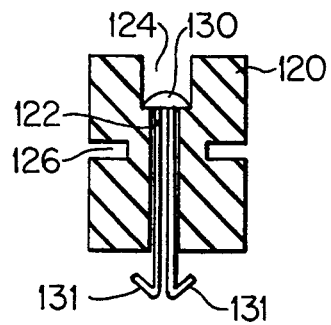
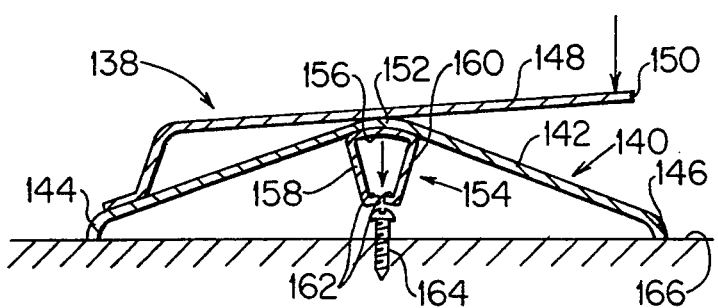
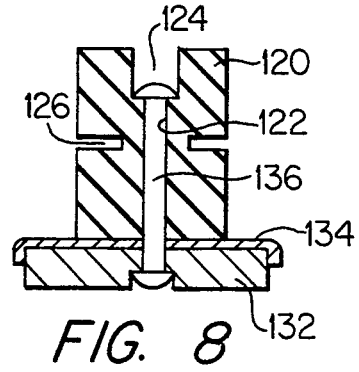

PUSH RELEASE SPRING CLIP

BACKGROUND OF THE INVENTION

1. Field of the Invention

This invention relates to spring clips of the type employed for releasably supporting articles on a surface and more particularly to an improved spring clip which may be releasably mounted on a support surface and which may easily be operated to releasably attach articles on or release articles from the support surface.

2. Description of the Prior Art

Spring clips have long been used to mount articles on support surfaces such as mirrors, doors, automobile windshields, walls, refrigerators, store windows, pegboards and the like, and various means such as suction cups, magnets and the like have been used to releasably attach the spring clip to the surface to which the articles are to be mounted. Examples of such prior art devices may be found in U.S. Pat. Nos. 957,804; 993,989; 2,505,899 and 2,800,078, each of which disclose a suction cup molded of a resilient rubber or rubber-like material having a thickened central body portion and an elongated resilient spring element molded within and extending outwardly from the body portion. The elongated springs are shaped to have one end projecting outwardly past the suction cup in position to bear against and be deformed by the surface to which the suction cup is attached.

The prior art spring clips of this general type have not been entirely satisfactory in that it has generally been necessary to physically lift the resilient spring element from the surface to which the device is mounted, thereby applying a lifting force acting against the suction force of the cup. This frequently resulted in the partial vacuum created by the resiliency of the suction cup being partially or entirely relieved, with the result that the suction cup frequently fell off the surface. Further, manually lifting the spring element required physically grasping the spring or inserting something under the terminal end portion of the spring to pry it from contact with the support surface to enable an article to be inserted thereunder. Thus, lifting the spring element was frequently awkward or inconvenient, making the devices difficult to use.

The use of magnetic mounting structures for spring clips generally has been limited to an arrangement wherein a separately operable spring biased clamping arrangement is physically mounted upon a rigid support which in turn is attached to a body of magnetic material which may be magnetically attracted and held onto a metallic surface. The magnetic mounting structure generally has a dimension sufficiently great to permit a push action release of the spring biased clamp without dislodging the magnetic support to enable an article to be inserted into the open jaws of the clamp at a location spaced from the support surface. While such devices are widely used, their construction is relatively expensive and they are only useful for mounting articles onto a magnetic surface. The spring biased clamping structure conventionally used on such clamps generally are not adaptable to a resilient mounting structure such as a suction cup or on a resilient body or head attached to a fastener such as a screw or the like. Further, neither the spring biased magnetically supported clamping devices nor the suction cup mounted spring clips has generally been universally adaptable to many mounting surfaces such as unfinished or semi-finished wood, drywall, plaster, fabric or pegboard type surfaces. Accordingly, it is a primary object of the present invention to provide an improved, easy-to-use spring clip which overcomes the disadvantages of the known prior art spring clips.

Another object is to provide such an improved spring clip structure which is universally adaptable to be mounted on various types of surfaces and to use different, interchangeable mounting means for attaching the spring clip to different surfaces.

Another object is to provide such an improved spring clip which may be operated by a simple push action which does not apply undue stress to the mounting structure or tend to dislodge the mounting structure from the support surface.

SUMMARY OF THE INVENTION

In the attainment of the foregoing and other objects and advantages of the invention, an important feature resides in providing a spring element formed from a relatively thin sheet-like material and having a central body portion adapted to be releasably attached to a support surface, a first end portion adapted to releasably clamp an article against the surface and a second end portion adapted to contact the surface when the spring element is mounted thereon. An actuating lever is attached to the elongated body intermediate the central portion and its first or clamping end, and extends in outwardly spaced relation to the body. Fastener means adapted to be attached to the surface has spring support means for engaging and releasably retaining the spring element to mount the clamp onto the support surface, with the first and second ends of the spring in contact with the surface. The actuating lever extends over the fastener means in the direction of the second end portion of the spring and in spaced relation thereto with the fastener means extending outwardly from the spring and contacting the lever. A force applied to the lever in the direction of the support surface tends to pivot the lever about the point of contact with the fastener means to lift the first end portion of the spring from contact with the support surface to permit articles to be inserted thereunder.

The fastener means may include a projecting head for contact with the actuating lever to act as a fulcrum or pivot point for the lever to facilitate deflecting the resilient spring element to lift the clamping end from the support surface. A plurality of interchangeable fastener elements may be employed with the spring element, with the respective fastener elements each being adapted to be releasably attached to a particular surface such as wood, glass, pegboard, plaster, magnetic surface, or the like. For attaching to a smooth surface such as glass, the fastening element may be in the form of a suction cup having an integrally formed head adapted to have the spring body releasably attached thereto as by insertion through a keyhole opening in the spring body with a groove in the resilient head of the suction cup engaging a retaining slot in the opening and with the head portion projecting outwardly from the spring body in position to engage the actuating lever.

Other fastening devices may include a screw fastener having an enlarged resilient head mounted thereon for engaging and retaining the spring body to mount the device on a wood or similar surface, or a resilient clip arrangement for mounting the device on a pegboard. Since the clamp is actuated by a pushing force toward the supporting surface, attaching and releasing articles to the surface using the device does not have any tendency to dislodge the fastener and the spring clamp from the supporting surface. The actuating lever may be integrally formed with the spring body or separately formed and either permanently or releasably attached to the spring body.

BRIEF DESCRIPTION OF THE DRAWINGS

Other features and advantages of the invention will be apparent from the detailed description contained hereinbelow, taken in conjunction with the drawings, in which:

FIG. 3 is a transverse vertical sectional view showing a modification to the structure of FIGS. 1 and 2;

FIG. 4 is an exploded isometric view of an alternate embodiment of the invention;

FIG. 6 is a sectional view showing an alternate fastener means for attaching the spring clip assembly to a support surface;

FIG. 7 is a sectional view showing a further embodiment of the fastener means;

FIG. 8 is a sectional view showing a further embodiment of the fastener means; and FIG. 9 is a vertical sectional view showing a further embodiment of the invention.

DESCRIPTION OF THE PREFERRED EMBODIMENT

Figure 1:
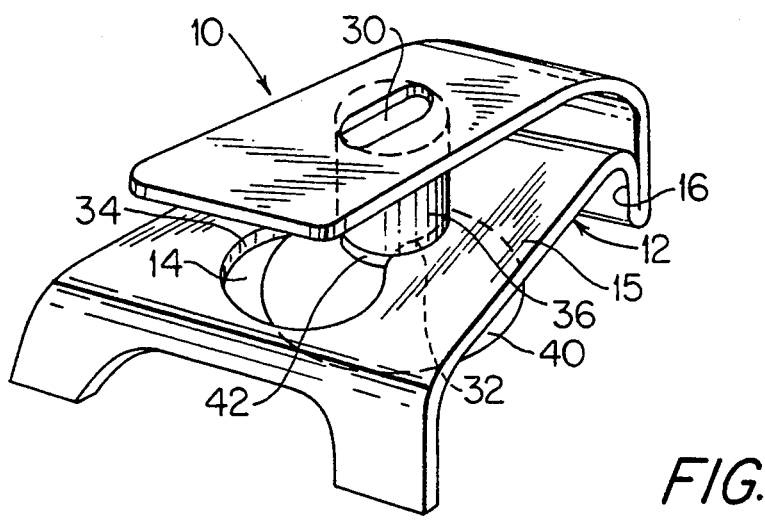
FIG. 1 is an isometric view of an improved spring clamp device embodying the present invention.
Figure 2:
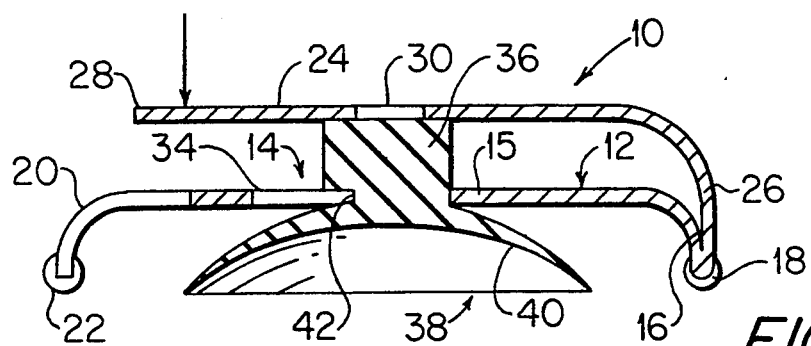
FIG. 2 is a longitudinal vertical sectional view, in elevation, of the spring clip shown in FIG. 1.

Referring now to the drawings in detail, a preferred embodiment of the improved spring clip assembly according to the present invention is illustrated in FIGS. 1 and 2 and is indicated generally by the reference numeral 10. Clip 10 includes an elongated spring member 12 formed from a relatively thin sheet of spring material such as spring steel or a high strength resilient plastic and having a key-shaped opening 14 formed in its central body portion 15. Spring 12 also includes a curved clamping end portion 16, preferably having its terminal end covered with a resilient high friction material such as a soft plastic as indicated at 18 in FIG. 2, and a similarly curved rear end portion or stabilizing foot portion 20 also preferably having a resilient coating 22 formed thereon, with coatings 18 and 22 acting both to provide a high friction, slip resistant characteristic to the assembly and to provide as a protective cover to prevent any sharp edges or corners from marring or scratching the support surface. In the embodiments shown in FIGS. 1–4, end portions 16 and 20 are curved downwardly from the general plane of central body 15 to engage and be deflected upward by a support surface when the assembly is mounted on the surface.

An elongated release arm or lever 24 has one end 26 attached to the resilient spring member 12 at a location between the central opening 14 and the clamping end 16. Lever 24 extends in outwardly spaced relation to the top surface and overlaying the opening 14 in spring 12 and terminates in a free end 28 spaced from the stabilizing foot 20. Preferably a central opening 30 is formed in the lever 24 at a location overlying the narrow or necked-in portion 32 of the keyhole shaped opening 14 for purposes to be described more fully hereinbelow. Opening 14 also has an enlarged section 34 dimensioned to freely receive the resilient head 36 of a fastener element indicated generally at 38.

Fastener 38 may include a conventional resilient suction cup element 40 which, when mounted on spring 12 and in the relaxed state, projects from the central body portion 15 of spring 12 a distance greater than the clamping end 16 and foot 20. A narrow neck or groove 42 is formed in the head 36, with the groove 42 dimensioned to be received in the narrow locking slot 32 after the head 36 has been projected through the larger portion 34 of the keyhole opening 14. The dimension of the head 38 is such that, when the groove or neck 42 is received in the keyhole slot 32, the resilient head bears against the undersurface of the release arm or lever 24 in the area of the opening 30. An interference fit between the slot or neck 42 and the opening 32 releasably retains the suction cup fastener in assembled relation with the metallic spring body.

In order to attach the clamping device 10 to a supporting surface such as a mirror, refrigerator door, or the like, the suction cup is positioned against the supporting surface and pressure is applied to the release lever in a direction toward the supporting surface. This pressure is transmitted through the head 38 to attach the suction cup in the conventional manner. This force will also bend the spring body sufficiently to apply a force through the ends 16 and 20 of the spring 12 to the surface.

Once the clamping device is attached to a surface, articles may easily be inserted under the clamping end of the assembly by applying a simple pushing force to the rearwardly projecting free end 28 of the actuating lever 24 to lift the clamping end 16 from contact with the surface. This action, while raising the clamping foot, automatically applies attaching pressure to the suction cup each time the device is actuated so that frequent actuation assures continued suction force applied by the suction cup to retain the assembly in position.

The elongated spring member 12 and release lever 24 preferably are formed as a unitary structure, either being formed of a single piece of material which is folded upon itself at the clamping end 16 or as separate pieces which are subsequently rigidly joined, as by spot welding or the like. In an alternate embodiment described hereinbelow, however, the two elements may be separately formed and releasably attached in a manner to provide essentially the same mechanical interaction.

FIG. 3 illustrates a slight modification of the structure illustrated in FIGS. 1 and 2 wherein a retainer 46 is provided to securely retain the fastener head 36 in the keyhole opening of the spring body 12. In this embodiment, the retainer comprises an annular ring 48 which surrounds the projecting fastener head 36 between the top surface of spring member 12 and the bottom surface of release arm 24. Integrally formed on and projecting outwardly and downwardly from the ring 48 is a pair of generally arcuate arms 50 each terminating in a tapered end 52 adapted to be pushed through and snapped into corresponding openings positioned one at each side of the narrow locking part 32 of the keyhole shaped opening. A detent is formed adjacent the tapered ends 52 to releasably hold the retainer in position relative to the spring element whereby the ring 48 prevents inadvertent disassembly of the spring and retainer head. The retainer 46 is preferably formed from a resilient material such as plastic to facilitate assembly and to enable limited deflection, if necessary, as a result of pressure on the actuating lever. It is believed apparent that the retainer 46 could act as the fulcrum for the actuating lever 24, if desired, in which case the fastener head 34 need not engage the actuating lever.

Referring now to FIG. 4, an alternate embodiment of the invention is illustrated in which the elongated spring element 60 and actuating lever 62 are formed as separate pieces which are releasably assembled together. The spring member 60 includes a central substantially flat body portion 64 having a downturned clamping end 66 similar to end 16 of the embodiment described above. At the opposite or reaction end, spring 60 has a pair of spaced reaction legs or feet 68 which are spaced apart to provide stability against tilting, with the inner, generally opposed surfaces 70 of the legs 68 extending upwardly and intersecting a substantially circular central opening 72. An elongated, transversely extending generally rectangular opening 74 is formed in the central body portion 64 at a location spaced from the central opening 72 in the direction of the clamping foot 66, and a pair of laterally spaced generally parallel rectangular openings 76 are formed one on each side of central opening 72. Preferably surfaces 70 of legs 68 intersect the circular opening 72 at locations to provide a restricted entrance 78 to the central opening 72 to provide retainer means for the fastener head such as the head 34 described hereinabove.

Actuating lever 62 is provided with a downturned end portion 80 terminating in an integrally formed hook element 82 adapted to be received in the opening 74, and an elongated substantially planar body portion 84 preferably having a central opening 86 formed therein in position to overlie the central opening 72 in spring member 60. A pair of downwardly extending closely spaced leg members 88, 90 are integrally formed on the body 84 at each side edge thereof outboard of the central opening 86, with each leg 88, 90 being formed at its lower end with a tapered detent member adapted to be pressed through the openings 76 to releasably retain the actuating lever on the top surface of the spring element. Preferably, the length of the legs 88, 90 are such that, when received in the openings 76, the bottom surface of body 84 rests upon the top surface of the resilient actuator head 36 so that pressure applied to the rear end portion in the direction of arrow 92 will apply a lifting force through the hook 82 to the clamping end 66 of the clip in substantially the same manner as described above. Also, legs 88, 90 may be formed with shoulders 91, 92, respectively, which will engage the top surface of the body portion adjacent the openings 76 and act as the fulcrum for the lever 62, whereby contact with the retainer element by the lever is not required.

If desired, the central opening 86 may be formed in a punching operation which simultaneously provides a downturned lip 94 in position to fit within a recess 95 in the top of the underlying fastener head 34 to provide additional retention for the assembly against removal or dislodgement from the fastener. Alternatively, other retaining means such as a separately formed ring member indicated at 96 may be attached, as by bonding, to the under surface of the body 84 surrounding the opening 86 to serve the same function. For normal use, however, the detent provided by the dimension of the entrance 78 to the opening 72 should normally provide sufficient resistance to dislodgement from the fastener element head.

Figure 5A:
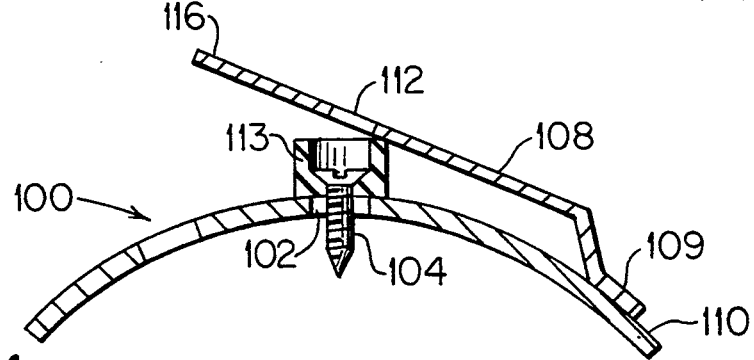
FIGS. 5A and 5B are sectional views, in elevation, of a further embodiment of the invention.
Figure 5B:
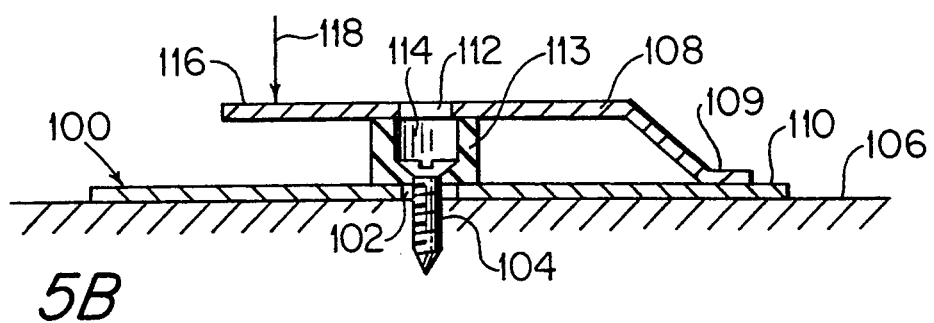

FIGS. 5A and 5B show a further embodiment of the invention wherein the elongated spring body 100 is a generally arcuate member having a central opening 102 formed therein for receiving a screw fastener 104 for attaching the assembly to a support surface 106 as shown in FIG. 5B. An elongated actuating lever 108 has one end 109 attached to the elongated spring 100 adjacent one end 110 thereof by suitable means such as spot welding. Lever 108 and extends along the spring body in spaced relation thereto. An opening 112 is formed in lever 108 in position to overlie the opening 102 in spring body 100 and a resilient spacer member 113 having a recess 114 in its top surface is provided between the spring and lever. To attach the clamp element to a support surface, a screw or other suitable fastener is inserted through the opening 112, the spacer element 113 and the opening 102, and a screwdriver or other suitable means is inserted through the opening 112 to turn the screw and attach the assembly to the support surface, drawing the arcuate spring body 100 into firm surface-to-surface contact with the support surface 106. As in the embodiments described above, force applied to the overhanging end portion 116 of lever 108 in the direction of arrow 118 will lift its opposite end 110 and the attached portion of spring 100 to permit articles to be inserted thereunder.

FIGS. 6–8 illustrate alternate embodiments of fastener means which may be employed with the clamp elements shown in FIGS. 1-4. Each of these fasteners may include a resilient, generally cylindrical molded spacer element 120 having a central opening 122 extending therethrough for receiving a suitable fastener such as a wood screw. A recess 124 is provided in the top surface of body 120 for receiving the head of the fastener elements, and an annular groove 126 is formed in the resilient body 120 to be releasably received in the keyhole slot 14, or the circular opening 72 to releasably mount the clip assembly to a support surface.

In FIG. 6, the fastener member is illustrated as a wood screw 128 for attaching the body 120 to a wood surface or other surface which may be penetrated. In FIG. 7, the fastener is in the form of a clip member 130 having resilient hook means 131 for attaching the body to an opening in a surface such as a pegboard surface. In FIG. 8, the resilient body 120 is attached to a mounting structure in the form of a permanent magnet body 132 held within a retaining cup 134 by a rivet 136 or other suitable fastener means extending upwardly through the central opening in the body 120.

FIG. 9 illustrates a further embodiment of the invention wherein the clip assembly 138 comprises an elongated spring member 140 including a central body portion 142 and downturned end portions 144, 146. A lever member 148 is attached to spring 140 adjacent end 144 and extends along and in outwardly spaced relation to the outer surface of body 142 to terminate in a free end 150 at a location spaced from the downturned end 146 of the spring. The central body 142 is curved outwardly, i.e., in a direction opposite the downturned end portions, and has a transverse ridge or apex 152 which contacts the lever at a location spaced from the free end 150 with the apex 152 acting as the spring means or fulcrum of the first class lever.

Mounting means in the form of a resilient spring clip 154 is permanently secured to the concave side of the central body opposite the apex 152 by suitable means such as spot welding or by bonding. The spring clip 154 may be generally channel shaped, and include a central web 156 and downwardly directed legs 158, 160 each terminating in an inwardly and upwardly inclined hook element 162 adapted to snap over and be releasably retained by a detent on a fastening element, indicated as the head of screw 164 in mounting surface 166.

While the mounting element 154 in FIG. 9 has been described as a channel shaped clip member, it is believed apparent that this element could take various shapes. For example, the mounting means could be in the form of a rigid or semi-rigid mass having a threaded recess in its bottom surface for threadably engaging male threads on a cooperating fastener element.

It should be apparent from the above, that the releasable spring clip of the present invention may be readily used to mount articles on various support surfaces simply by selecting the appropriate interchangeable fastener element which is suitable for use with the particular material of the supporting surface. Regardless of the fastener element employed, once the spring clip is attached to the supporting surface, actuation of the device is the same. Further, force applied to the spring clip for attaching or removing articles from the surface is in a direction which relieves pressure from the mounting assembly and, where a suction cup type attachment means is employed, each actuation tends to reseal the suction cup by expelling any air which may have leaked beneath the suction cup. The simple push-release actuation is easy to use and facilitates attaching and releasing articles to a surface.

While preferred embodiments of the invention have been disclosed and described, it should be apparent that various modifications may be made thereto and it is therefore not intended to be restricted to the disclosed embodiments, but rather it is intended to include all embodiments which would be apparent to one skilled in the art and which come within the spirit and scope of the invention.

What is claimed is:

1. A spring clip assembly for use in releasably attaching articles to a support surface, comprising
   an elongated spring member having top and bottom surfaces, a central body and opposed end portions,
   an elongated actuating lever having one end attached to one of said end portions and extending therefrom along said top surface in outwardly spaced relation thereto and terminating in a free end,
   mounting means for releasably attaching said spring member to a support surface, and
   spacer means providing a fulcrum extending between said spring member top surface and said actuating lever,
   said lever being operable by a force applied thereto adjacent said free end in the direction of said spring member to engage said spacer means and cooperate with said mounting means to act as a fulcrum of a first class lever to deflect said one end of said spring means away from the support surface against the resilient spring force of the spring member.

2. The spring clip assembly defined in claim 1 further comprising a mounting opening extending through said central body portion, said mounting means including means extending through said mounting opening and engaging said top surface for releasably attaching said clip assembly to a support surface.

3. The spring clip assembly defined in claim 2 wherein said central body is generally planar and wherein said opposed end portions are formed to position the respective free ends from said planar body portion in a direction opposite said top surface to engage a support surface and retain the central body portion in spaced relation to the support surface.

4. The spring clip assembly defined in claim 3 wherein said mounting means comprises a resilient body including a suction cup adapted to be attached to a smooth support surface and wherein said means extending through said mounting opening and said spacer means are a common element formed as an integral part of said resilient body and projecting therefrom in position to be releasably received and retained in said mounting opening, said common element projecting outwardly from said top surface and engaging said lever.

5. The spring clip assembly defined in claim 4 wherein said integrally formed common element comprises a generally cylindrical body having an annular groove formed in its outer surface, and wherein said mounting opening comprises a generally keyhole-shaped opening including a first portion dimensioned to receive said body and a reduced portion dimensioned to fit with said annular groove to releasably retain said suction cup member and said spring member in assembled relation.

6. The spring clip assembly defined in claim 3 wherein said mounting means and said spacer means comprise a generally cylindrical body having an axial opening extending therethrough and an annular groove extending around its outer surface, said annular groove being adapted to be received and releasably retained within said mounting opening, and wherein said mounting means includes fastener means extending through said axial opening for releasably attaching said cylindrical body to a support surface.

7. The spring clip assembly defined in claim 6 wherein said cylindrical body is formed from a resilient material.

8. The spring clip assembly defined in claim 7 wherein said fastener means includes a headed fastener adapted to penetrate the support surface to attach the cylindrical body to the support surface.

9. The spring clip assembly defined in claim 7 wherein said headed fastener includes hook means adapted to be received in and releasably retained by standard pegboard.

10. The spring clip assembly defined in claim 7 wherein said fastener means comprises a magnetic body and means extending through said axial opening for mounting said magnetic body on one end of said cylindrical body.

11. The spring clip assembly defined in claim 2 wherein said actuating lever comprises a generally flat body portion extending in spaced relation to said central body portion, and an opening formed in said lever in generally overlying relation to the mounting opening in said spring whereby a tool may be inserted through said lever to engage said fastener means.

12. The spring clip assembly defined in claim 11 wherein said mounting means comprises a generally cylindrical body of resilient material, said cylindrical body having an axial opening extending therethrough and an annular groove extending around its outer surface, said annular groove being adapted to be received and releasably retained within said mounting opening, and wherein said fastener means includes means extending through said axial opening for releasably attaching said resilient body to a support surface.

13. The spring clip assembly defined in claim 12 wherein said fastener means comprises a threaded screw fastener.

14. The spring clip assembly defined in claim 11 wherein said spring member and said lever are formed from a single sheet of spring steel.

15. The spring clip assembly defined in claim 11 wherein said spring member is formed from a sheet of spring steel and wherein said lever is formed from a steel sheet, said lever and spring member being rigidly joined adjacent one end of said spring member.

16. The spring clip assembly defined in claim 11 wherein said spring member is formed from a sheet of spring steel and wherein said lever is formed from a sheet material, said spring member and said lever including integrally formed connector means for releasably joining said lever and said spring member.

17. The spring clip assembly defined in claim 1 further comprising restraining means engaging said spacer means for retaining said spacer means in position to act as a fulcrum for said lever.

18. The spring clip assembly defined in claim 17 wherein said restraining means comprises a removable clip adapted to be mounted on said spring member.

19. The spring clip assembly as defined in claim 11 wherein said spring member is formed from a sheet of spring steel and wherein said lever and said spring member include cooperating connector means for releasably joining said lever and said spring member, said cooperating connecting means including means defining said spacer means.

20. The spring clip assembly defined in claim 1 wherein said fulcrum comprises an outwardly deformed portion of said central body which contacts said lever at a point spaced from said free end.

21. The spring clip assembly defined in claim 20 wherein said mounting means comprises a connecting member mounted on the bottom surface of said spring member at a location substantially opposite said fulcrum, said connecting member including attachment means for releasably attaching the clip assembly to a separate fastener on the support surface.

* * * * *